J. W. SANDERS.
TRANSMISSION.
APPLICATION FILED SEPT. 20, 1919.
1,365,546.
Patented Jan. 11, 1921.
3 SHEETS—SHEET 3.
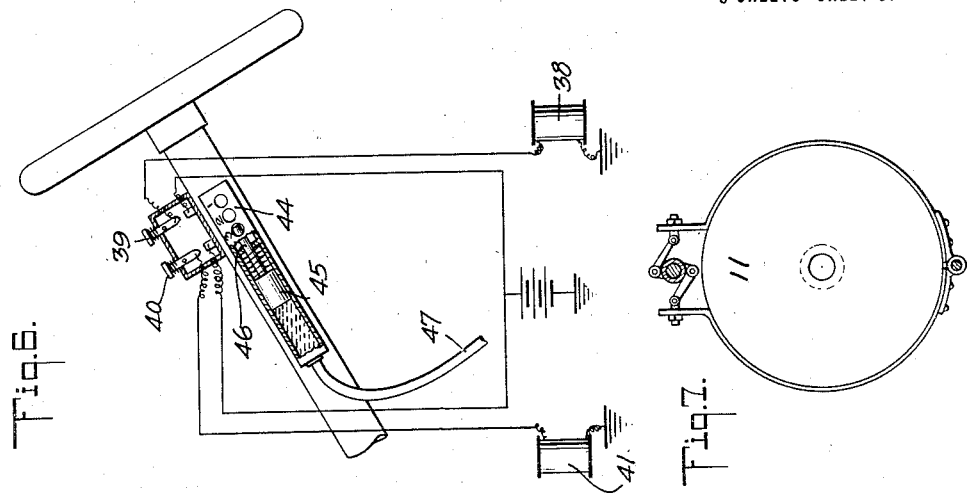
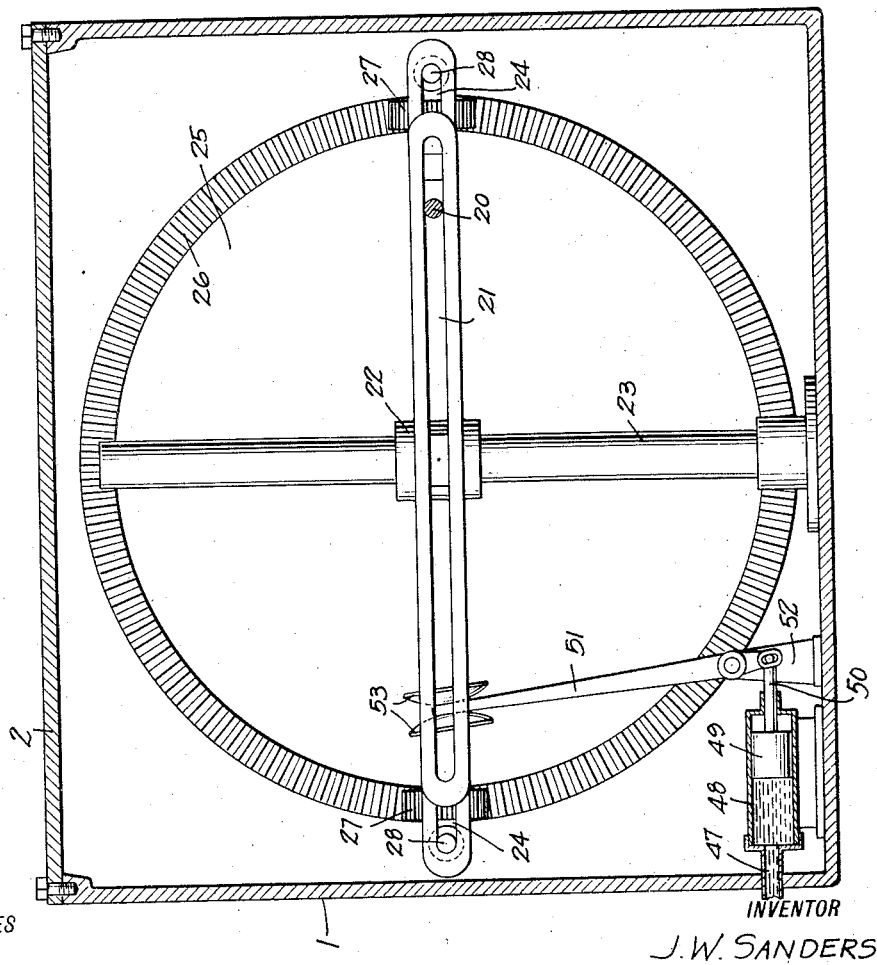
WITNESSES
Frederick Diehl.
INVENTOR
J. W. SANDERS
BY
ATTORNEYS

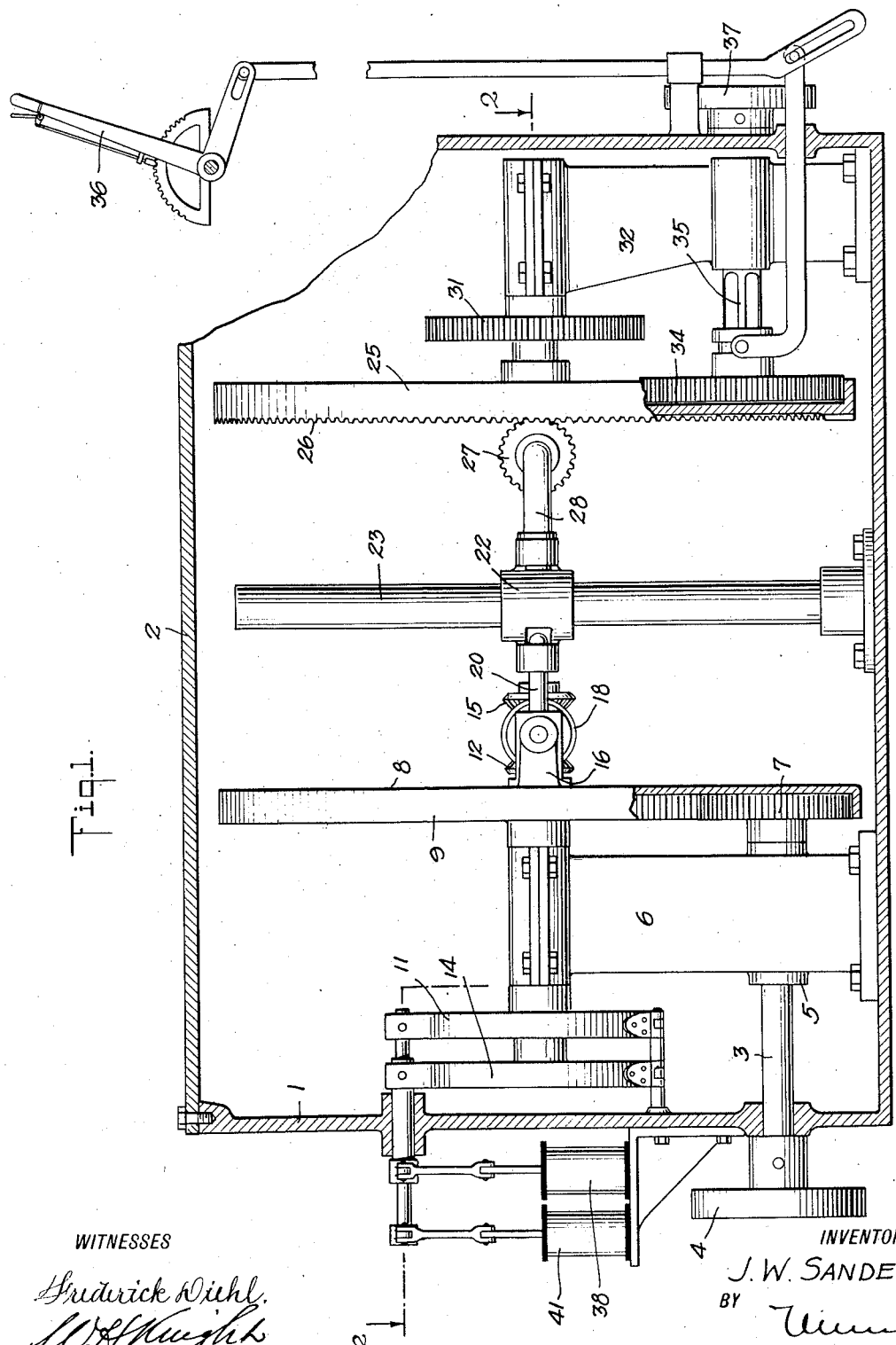

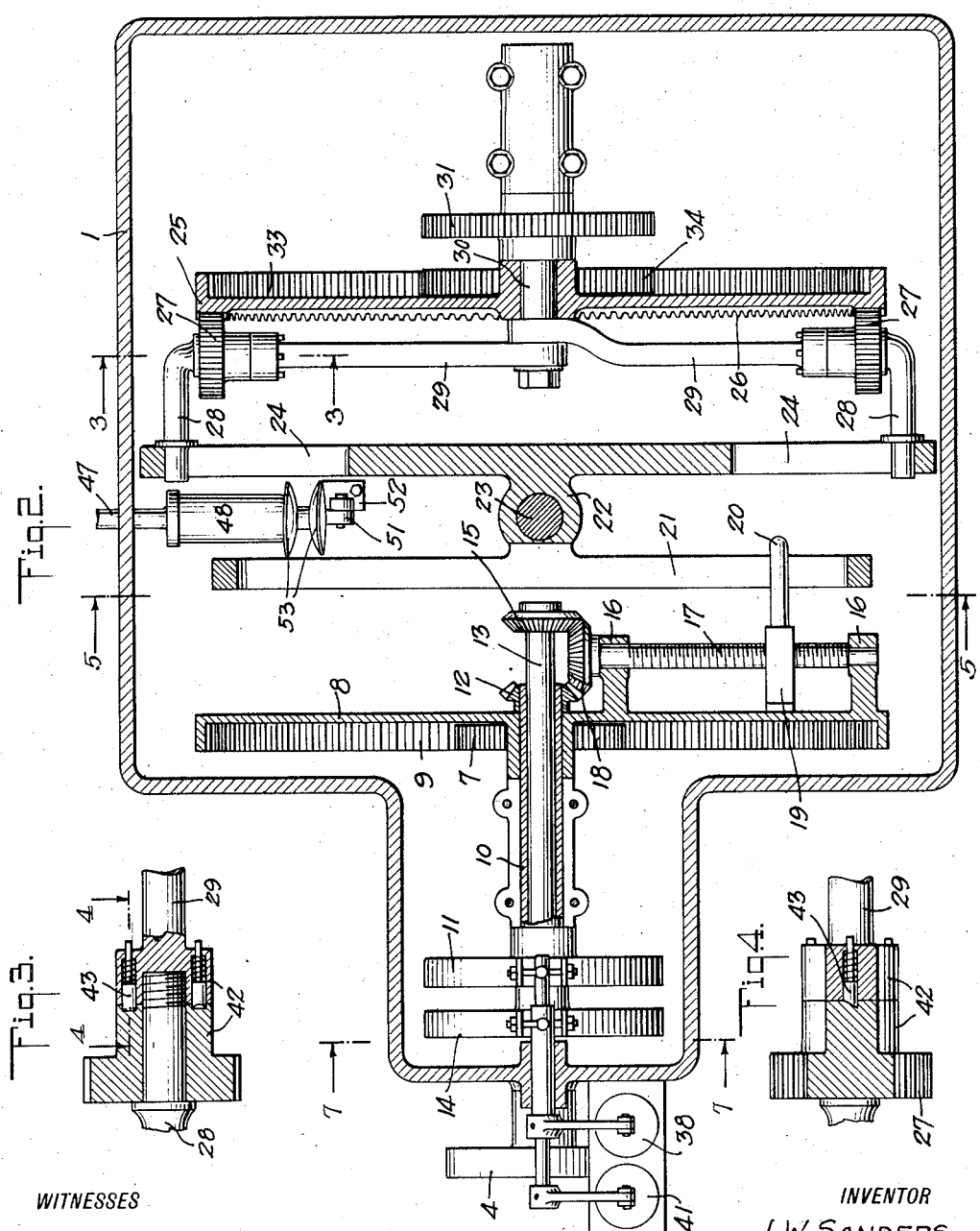

UNITED STATES PATENT OFFICE.

JOHN WILLARD SANDERS, OF BURLINGTON, VERMONT.

TRANSMISSION.

1,365,546.      Specification of Letters Patent.    Patented Jan. 11, 1921.

Application filed September 20, 1919. Serial No. 325,127.

*To all whom it may concern:*

Be it known that I, JOHN W. SANDERS, a citizen of the United States, and a resident of Burlington, in the county of Chittenden and State of Vermont, have invented a new and Improved Transmission, of which the following is a full, clear, and exact description.

The present invention relates in general to the transmission of power, and particularly to that class of transmission which is employed in motor vehicles and the like, where it is desirable to realize on a change-speed gearing for developing a slow traction without imposing an undue strain on the motor.

The heretofore employed change-speed gearing required the engine shaft to be disconnected from the drive shaft to change from one speed to another. This operation, aside from requiring a certain amount of skill, is inconvenient and is generally accompanied by a sudden jerking of the vehicle, which takes away from the easy-riding qualities of the vehicle.
In my invention, I have not only simplified the operation of going from one speed to another, but the change of speed will not be attended by any unpleasantness in the steady traction of the vehicle, to which end one of the principal features of the invention consists in producing a mechanism whereby the speed may be changed without throwing the clutch out or in any other way disconnecting the engine shaft from the drive shaft.

Another feature of my improved gearing consists in an electromechanical manipulating or shifting means whereby the gearing may be changed from one speed to another by merely pressing a button, or buttons, located in convenient reach of the chauffeur.

Still another feature consists in an indicating means for informing the chauffeur of the relative relation of the gearing, that is to say, to enable him to ascertain the particular position of the gearing which will correspond to the "high," "intermediate," and "low" speeds of the conventional type of gearing.
A further feature of the invention consists in an improved reversing gear which operates exceedingly well and conveniently with this particular form of change speed arrangement.
Other features will appear upon reference to the accompanying drawings, in which—

Figure 1 is a side elevational view of a transmission gearing constructed in accordance with the preferred form of the invention;
Fig. 2 is a sectional view on line 2—2, Fig. 1;

Fig. 3 is a sectional view on line 3—3, Fig. 2;

Fig. 4 is a horizontal section taken on line 4—4, Fig. 3;

Fig. 5 is a sectional view on line 5—5, Fig. 2;

Fig. 6 is a detail view showing the controlling means and the indicating means; and Fig. 7 is a cross-sectional view of one of the controlling drums.

Referring to the drawings in detail, 1 represents a suitable casing or housing which is adapted to inclose the change-speed gearing, a cover 2 being provided to render the gearing accessible for repair, etc. 3 represents the drive shaft, having the usual coupling flange 4 for connecting the shaft in driving relation with the engine shaft through the usual clutch and universal joint. This shaft 3, according to the preferred embodiment of the present invention, extends horizontally within the casing 1 and is supported in a suitable journal bearing 5 in the standard 6. The end of the shaft 3 is provided with a gear 7 which is in permanent driving relation with the driving element 8 through means of the teeth, thereby meshing with the teeth provided in the inner face of a flange 9. The driving element 8 is suitably mounted upon a hollow shaft 10, which in turn is journaled in a standard 6. Mounted on one end of this hollow shaft 10 is a drum 11, the other end being provided with a bevel gear 12. Mounted within and protruding from the hollow shaft 10 is a second shaft 13 on one end of which, adjacent the drum 11, is a second drum 14. The other end of the shaft is also provided with a bevel gear 15. The driving element 8, hollow shaft 10, the drums 11 and 14, and the bevel gears 12 and 15 are all arranged to rotate together.

Carried on the inner face of the driving element 8 are a pair of brackets 16, and mounted with freedom of rotation in the brackets is a spindle 17 having the bevel gear 18 at one end meshing with the bevel gears 12 and 15. The spindle 17 is threaded almost its entire length and has a threaded engagement with a block 19 which is free to travel on the spindle 17 between the brackets 16. The block 19 is provided with an outwardly-extending arm 20 adapted to work within a recess 21 in a horizontal, intermediate connecting member 22. This member 22 is mounted upon an upright 23 and free to reciprocate thereon. The member is further provided with a parallel bar opposite the recess 21 which has a pair of recesses 24 adjacent its ends.

25 represents the driven element, which is constructed somewhat similar to the driving element 8 with the exception that its inner face is provided with a toothed flange 26 which is engaged by a pair of oppositely-disposed gears 27, the supporting arms 28 for which are bent rearwardly and terminate in the recesses 24. The gears 27 are further supported in mesh with the toothed flange 26 of the driven element 25 by means of the radial arms 29 which are mounted upon a shaft 30, on which the driven element 25 is also mounted, as well as the reverse gear 31. The shaft 30 is journaled in a standard 32. As stated, the driven element 25 is constructed similarly to the driving element 8 in that it has a toothed flange 33 with which the gear 34 is adapted to mesh, which gear in turn is mounted on the sliding shaft 35 journaled in the standard 32. By means of a lever arrangement 36, the gear 34 may be thrown in and out of driving relation with the driven element 25 and thus control the driven shaft, which would be connected to a flange coupling 37 mounted on the opposite end of the shaft 35.

The operation of the mechanism is as follows: The motor transmitting power to the shaft 3 will impart rotation to the driving element 8, likewise the gears 12 and 15. In view of the outwardly extending arm 20 being confined within the recess 21 in the member 22, rotation of the block by the driving element 8 will cause the member 22 to reciprocate upon the upright 23, and in doing so the peculiar connection between the gears 27 and the member 22 will cause the gears to revolve the driven element 25.

Should a change of speed be desirable, the solenoid 38 may be energized by means of closing the circuit with the button 39 on the steering column, in which event the brake band on the drum 14 will be contracted and impose a braking effect upon the gear 15 which would enable the gear 12 to rotate the spindle 17 to cause the extended arm 20 and block 19 to travel outwardly relative to the recess 21 and increase the travel or reciprocation of the member 22 upon the upright 23. This in turn would likewise increase the throw of the gears 27 and change the speed ratio of the driven element 25 relative to the driving element 8. This operation would be practically the movement of going from "intermediate" gear into "high," according to the arrangement of the conventional type of change-speed gear; and should it be desirable to go back into "intermediate," or even "low," the other button 40 on the steering column could be pressed to close the circuit with the solenoid 41, which would lock the drum 11 by means of its brake band, as well as locking the gear 12, and permit the gear 15 to move the block 19 inwardly, which would decrease the travel or reciprocation of the member 22 upon the upright 23.

In order to prevent the turning of the gears 27 in a direction opposite to that which they are supposed to function, each gear is provided with a clutch arrangement, such as the two abutting faces 42, one face being provided with notches and the other face being provided with spring-pressed plungers 43 adapted to engage the notches, and so constructed as to enable the gears to loosely rotate in one direction but confine them in driving relation in an opposite direction. Referring further to these gears 27, it should be noted that as the member 22 reciprocates and the arms 29 rock back and forth, one of the gears is locked on the upstroke and pushes the driven element on the down stroke, the other gear working the reverse to this in order that as the member 22 reciprocates the driven element is acted upon by either one of the gears 27 at each stroke in the reciprocation of the member 22.

In manipulating the lever 36 to throw the gear 34 in or out of mesh with the driven element 25, it may be further actuated to mesh with the reverse gear 31, which will provide a suitable reversing means.

As a means for indicating the relative position of the gears, the steering column is provided with an indicator 44, consisting of a casing having preferably three openings in the side thereof corresponding to "low," "intermediate" and "high" gear. This casing also provides a dashpot or cylinder for the spring-pressed plunger, which is provided with a stem 46 adapted to travel past the openings referred to. Connected to the dashpot is a fluid conduit 47 which terminates in communication with a cylinder 48 located within the casing 1. Within the cylinder 48 is a piston 49 having a piston rod 50 extending out of the cylinder and pivotally connected to a lever 51 which is fulcrumed on the support 52 with its free end terminating adjacent the recess 21 in the member 22, whereby the outwardly-extending arm 20 contacts with buffer plates 53 on the lever 51. The piston 49 will be actuated to force the oil into the cylinder of the indicating device and thus act upon the piston 45 to move the stem 46 into different positions relative to the openings in the side of the indicator. Thus, the chauffeur by observing, or by touch, may ascertain approximately what gear he is driving in.

Having thus described my invention, I desire to claim as new and secure by Letters Patent:

1. In a transmission mechanism, a driving element and a driven element, means connecting said elements adapted to change the speed ratio of one, to the other, comprising an intermediate reciprocating member, a drive connection between said member and the driving element, a driving connection between said member and the driven element, and means for controlling the effective functioning of the connection between the driving element and the intermediate reciprocating member.

2. In a transmission mechanism, a rotary driving element, a rotary driven element, an intermediate member, means connecting the rotary driving element with the intermediate member adapted to convert the rotary motion of the driving element into reciprocation of the intermediate member, means connecting the intermediate member with the driven element adapted to convert the reciprocating motion of the former into a rotary motion for the latter, and means for regulating the reciprocation of the intermediate member.

3. In a transmission mechanism as set forth in claim 2 and in combination with means for indicating the relative functioning position of the connecting means between the said intermediate member and the rotary driving element.

4. In a transmission mechanism, a rotary driving element forming an outwardly projecting arm, an intermediate member having an elongated recess in which said arm works, said arm adapted to reciprocate said intermediate member, means for controlling the effective functioning of said arm, a driven element and motion-converting means connecting said intermediate member with said driven element.

5. In a transmission mechanism as set forth in claim 4 and in combination with means for indicating the relative functioning position of said arm.

6. In a change-speed gearing, a driving element comprising a rotary gear having an internal drive with a motor shift, a pair of gears mounted co-axially with said rotary gear, a gear meshing with said pair of gears, a threaded spindle on said gear, a speed-changing block having a threaded mounting on said spindle, a horizontal reciprocating member having a pair of recessed bars, an arm on the speed-changing block engaging the recess of one of said bars, a driven element comprising a rotary gear having an internal drive with a shaft to be driven, a toothed rack on the opposite side of the driven element, a pair of gears meshing with said rack, a drive connection between said pair of gears and the other bar of the reciprocating member, and a speed-changing control for regulating the position of the speed-changing block relative to said spindle.

7. In a transmission for motor vehicles, a driving gear having a driving connection with the motor shaft, an intermediate reciprocating member, a differential connection between the driving gear and said member, said differential connection embodying in its construction a speed-changing device, a driven gear having a driving connection with a shaft to be driven, a drive between the driven gear and the intermediate reciprocating member, and means for controlling the speed-changing device.

8. In a transmission for motor vehicles as set forth in claim 7 and in which the differential connection between the driving gear and the intermediate reciprocating member comprises a pair of gears mounted independently of but coaxially with the driving gear and on separate shafts, a brake drum on each shaft, a solenoid for inducing a braking effect on each brake drum, a control for the solenoids, the said speed-changing device comprising a threaded spindle incorporated in the differential connection having a block in threaded engagement therewith, and an arm on the block engaging a recess in a horizontal bar on the intermediate reciprocating member, whereby by inducing a braking effect on one of the brake drums the spindle will be rotated to move the speed-changing block thereon and slide the said arm in the recess in said horizontal bar and restrict or increase the reciprocation of said intermediate member.

9. In a transmission for motor vehicles, a driving and driven gear, a reciprocating member having a driving connection with said gears, the driving connection between the driving gear and the reciprocating member embodying a speed-changing device comprising a normally inactive spindle having a movable block with an arm engaging a recess in a bar on the reciprocating member, and means for rotating the spindle and changing the position of said arm in said recess for the purpose as set forth.

10. In a transmission for motor vehicles as set forth in claim 9 and in combination with means for indicating the position of said arm in said recess.

11. In a transmission for motor vehicles as set forth in claims 9 and 10 and in which the speed-changing effect is produced through a pair of electromechanically-controlled brake drums having separate, controlled gears meshing with a gear on the said spindle.

JOHN WILLARD SANDERS,